UNITED STATES PATENT OFFICE.

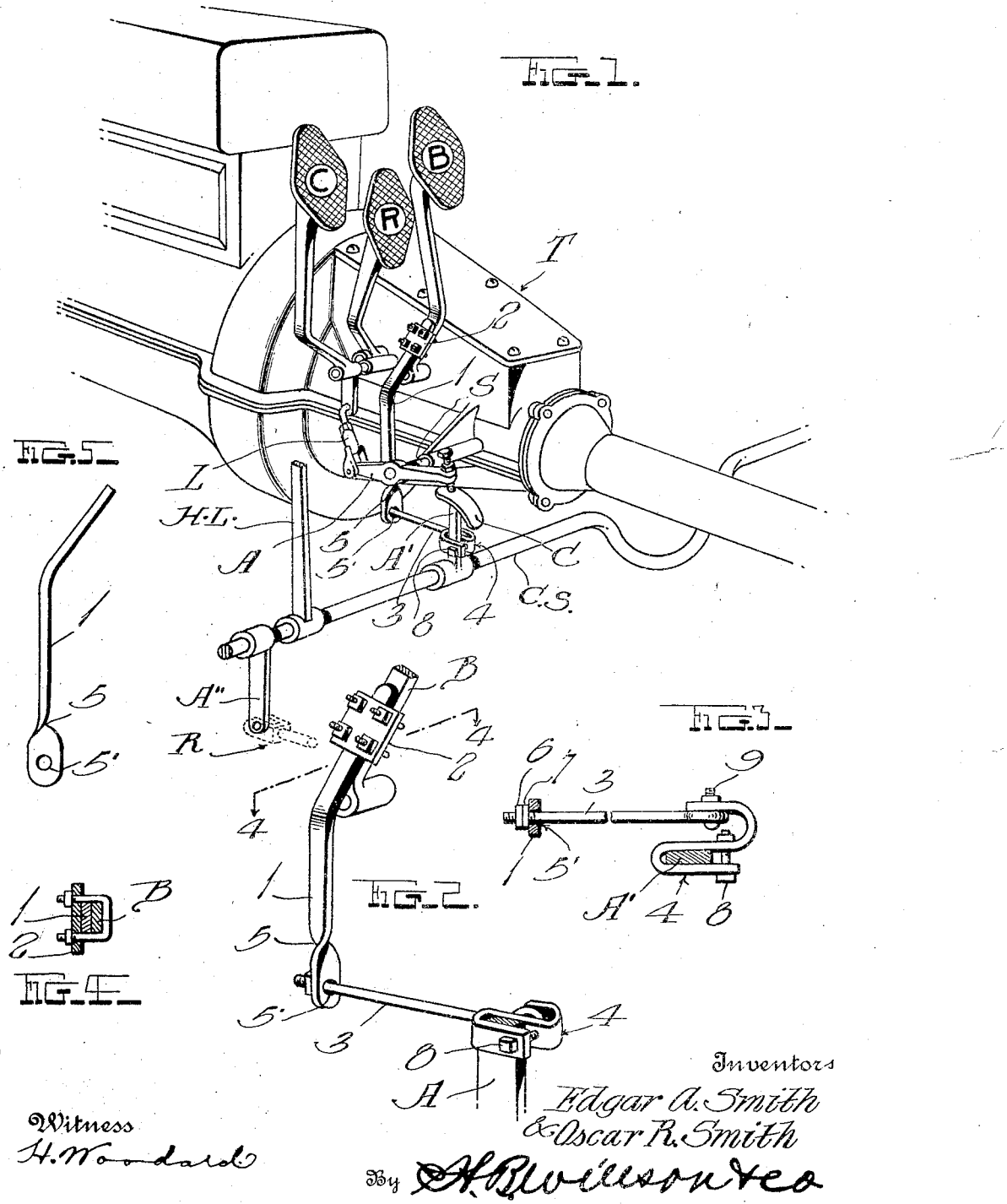

OSCAR RHODES SMITH AND EDGAR ARMITAGE SMITH, OF WINDSOR, NORTH CAROLINA.

BRAKE-OPERATING ATTACHMENT FOR AUTOMOBILES.

1,295,225.  Specification of Letters Patent.  Patented Feb. 25, 1919.

Application filed June 4, 1917. Serial No. 173,782.

*To all whom it may concern:*

Be it known that we, OSCAR RHODES SMITH and EDGAR ARMITAGE SMITH, citizens of the United States, residing at Windsor, in the county of Bertie and State of North Carolina, have invented certain new and useful Improvements in Brake-Operating Attachments for Automobiles; and we do declare the following to be a full, clear, and exact description of the invention, such as will enable others skilled in the art to which it appertains to make and use the same.

Our invention relates broadly to improvements in brake mechanisms for automobiles and more particularly to an attachment to connect the service brake pedal of a Ford automobile with the clutch operating arm of the usual transverse controller shaft which is operated by a hand lever and acts also to apply the emergency brakes located in the drums of the rear wheels. Experience has taught that the emergency brake drums often become so filled with grease from the rear axle casing as to prevent the emergency brakes from operating. On account of this it is the policy of a number of drivers to totally disconnect the emergency brakes from the controller shaft, using only the service brake. By this arrangement, however, there is no way of applying brakes to the car when the same is standing and thus when the engine is started, the vibration often causes the entire machine to start prematurely. To overcome this difficulty, we have devised the present invention by whose use the service brake will be applied when the hand lever of the controller shaft is drawn rearwardly to throw the clutch out.

With the foregoing end in view, the invention resides in the unique features of construction and combination of parts hereinafter fully described and claimed and shown in the drawings wherein:—

Figure 1 is a perspective view of the transmission housing of a Ford automobile and the parts associated therewith, showing the invention applied;

Fig. 2 is an enlarged perspective view of the attachment and portions of the parts with which it coöperates;

Fig. 3 is a detail horizontal section showing a plan view of the link and the clamp by which it is connected to the upstanding arm of the controller shaft;

Fig. 4 is a detail horizontal section on the plane of the line 4—4 of Fig. 2; and Fig. 5 is an edge elevation of the vertical bar which is secured to the service brake foot pedal.

In the drawings above briefly described, T designates the transmission housing of a Ford automobile, C the clutch pedal, R the reverse pedal, and B the service brake pedal. The clutch lever C is connected by the usual link L with the rocker arm A of the clutch controlling shaft S, said arm coöperating with the cam C on the upstanding crank arm A' of the transverse control shaft C S. The shaft C S is provided with depending crank arms A'' usually connected with the brake rods R which lead to the emergency brakes within the drums of the rear wheels, and said shaft is equipped with the hand lever H L by means of which it may be rocked. The operation of the parts so far described is well known, the hand lever H L serving through the medium of the parts A', C, A and S to throw the clutch out and to also apply the emergency brakes when said hand lever H L is pulled rearwardly. As above stated, however, the rods R are often detached so that the emergency brakes are not applied, but due to the nature of the present invention, the service brake pedal B is automatically depressed when the lever H L is pulled rearwardly.

The invention consists briefly of a rigid bar 1 secured by a clamp 2 to the lower end of the pedal B and extending below the pivot of said pedal, and a link 3 pivotally connected by means of a clamp 4 with the arm A', said link having a sliding connection with the lower end of the bar 1.

The upper end of the bar 1 extends obliquely for contact with the similarly extending lower end of the pedal B, so as to dispose the body of said bar vertically, the lower end of said body being given a quarter turn at 5 and formed with an eye 5' through which the link 3 passes slidably, said link having any suitable stop in front of said eye, said stop preferably consisting of a pair of nuts 6 and 7, the one locking the other.

The clamp 4 is preferably formed of a single metal bar bent into the form of an S, one loop of the S receiving the arm A' while the link 3 extends into the other loop, bolts 8 and 9 being provided respectively for contracting the first named loop around the arm A' and for pivotally connecting the link with the other loop.

By constructing the attachment in the simple manner described, it may be easily and inexpensively manufactured and marketed and may be applied to the car by practically any operator. When in use, the attachment serves to apply the service brake when the hand lever H L is pulled rearwardly to throw the clutch out and thus locks the car while standing. The device, however, in no manner interferes with the operation of the pedal B since when the latter is moved by the right foot of the operator, the eye 5' slides upon the link 3.

The invention may be attached to cars without detaching the rods R and when so used, it will be obvious that when the lever H L is pulled rearwardly to apply the emergency brake, the service brake will also be thrown into operation, thus allowing the car to be brought to a standstill more quickly than otherwise.

On account of the advantages above pointed out, the construction shown and described constitutes the preferred form of the attachment, but it is to be understood that within the scope of the invention as claimed, numerous minor changes may be made without sacrificing the principal advantages.

We claim:—

1. An attachment for applying the service brake of an automobile when the transverse controller shaft is rocked to throw the clutch out, said attachment comprising a rigid bar and means for securing it to the service brake pedal with its lower end below the pivot of said pedal, said end having an eye, a link passing slidably through said eye, means for pivotally connecting the rear end of said link with the upstanding clutch operating arm of the controller shaft, and a stop carried by said link in front of the eye.

2. An attachment for applying the service brake of an automobile when the transverse controller shaft is rocked to throw the clutch out, said attachment comprising a vertically disposed bar having its upper end extended laterally in an inclined direction for contact with the inclined lower end of the service brake foot pedal, means for securing said inclined end of the bar to said pedal, the lower end of said bar being given a quarter twist and formed with an opening, a link passing slidably through said opening, means for pivotally connecting the rear end of said link with the upstanding clutch operating arm of the controller shaft, and a stop carried by said link in front of the aforesaid bar.

3. An attachment for applying the service brake of an automobile when the transverse controller shaft is rocked to throw the clutch out, said attachment comprising a bar and means for connecting its upper end with the lower end of the service brake foot pedal, said bar being of a length to position its lower end in substantially the same horizontal plane with the controller shaft, and a link device connected with the lower end of said bar and extending rearwardly therefrom in substantially a horizontal direction, said link having means at its rear end for operatively connecting it with the upstanding clutch operating arm of the controller shaft.

4. In an automobile brake mechanism, the combination of a foot pedal for applying the service brake, a transverse rocking controller shaft for throwing the clutch out when the car is standing, and means associated with said shaft and pedal for applying the latter when the former is rocked or for permitting depression of said pedal independently of said shaft.

5. In an automobile brake mechanism, the combination of a foot pedal for applying the service brake, a transverse rocking controller shaft in rear of said pedal having a hand lever and a rigid upstanding arm for throwing the clutch out when said shaft is rocked, a rigid bar secured to said brake pedal and extending below the pivot thereof, and a connecting device leading rearwardly from the lower end of said bar and operatively coacting with the aforesaid upstanding arm of the controller shaft.

6. In an automobile brake mechanism, the combination of a foot pedal for applying the service brake, a transverse rocking controller shaft in rear of said pedal having a hand lever and a rigid upstanding arm for throwing the clutch out when said shaft is rocked, a rigid bar secured to the pedal and extending below the pivot thereof, the lower end of said bar having an eye, a link pivotally connected with the aforesaid arm and sliding through said eye, and a stop on said link in front of said eye.

7. The combination with the brake operating mechanism of an automobile including a foot brake pedal, a hand lever, a clutch lever operated thereby, and means fixed to the said pedal and adapted to coöperate with the said clutch lever for moving the foot pedal into operative position when the said clutch lever is actuated.

In testimony whereof we have hereunto set our hands in the presence of two subscribing witnesses.

OSCAR RHODES SMITH.
EDGAR ARMITAGE SMITH.

Witnesses:
N. S. PRITCHARD,
L. D. PERRY.